US009069751B1

(12) United States Patent
Nestler

(10) Patent No.: US 9,069,751 B1
(45) Date of Patent: Jun. 30, 2015

(54) SYSTEMS AND METHODS FOR MANAGING DOCUMENT PEDIGREES

(75) Inventor: Roger H. Nestler, Clay, NY (US)

(73) Assignee: Exelis, Inc., McLean, VA (US)

( * ) Notice: Subject to any disclaimer, the term of this patent is extended or adjusted under 35 U.S.C. 154(b) by 1126 days.

(21) Appl. No.: 12/506,494

(22) Filed: Jul. 21, 2009

(51) Int. Cl.
  *G06F 17/24* (2006.01)
  *G06F 17/27* (2006.01)
  *G06F 17/30* (2006.01)

(52) U.S. Cl.
  CPC .................................. *G06F 17/2705* (2013.01)

(58) Field of Classification Search
  USPC ........... 715/229–231; 707/610, 638, 661, 673
  See application file for complete search history.

(56) References Cited

U.S. PATENT DOCUMENTS

| 4,558,413 | A | * | 12/1985 | Schmidt et al. | 717/170 |
| 5,835,601 | A | * | 11/1998 | Shimbo et al. | 713/165 |
| 6,189,016 | B1 | * | 2/2001 | Cabrera et al. | 1/1 |
| 6,366,933 | B1 | * | 4/2002 | Ball et al. | 715/203 |
| 6,480,858 | B1 | * | 11/2002 | Boa et al. | 707/713 |
| 6,493,732 | B2 | | 12/2002 | Aoyama et al. | |
| 7,134,071 | B2 | | 11/2006 | Ohwada et al. | |
| 7,298,511 | B2 | | 11/2007 | Lay et al. | |
| 7,356,511 | B2 | * | 4/2008 | Gaya | 705/51 |
| 2006/0106889 | A1 | * | 5/2006 | Mannby | 707/203 |
| 2006/0136511 | A1 | * | 6/2006 | Ngo et al. | 707/203 |
| 2006/0206540 | A1 | * | 9/2006 | Lehner | 707/203 |

* cited by examiner

*Primary Examiner* — Stephen Hong
*Assistant Examiner* — Wilson Tsui
(74) *Attorney, Agent, or Firm* — Edell, Shapiro & Finnan LLC

(57) ABSTRACT

A method and system for managing and tracking the pedigree or data lineage of an electronic document. The methods and systems provide a standardized way for managing the pedigree of an electronic document regardless of its data type.

15 Claims, 5 Drawing Sheets

SYSTEMS AND METHODS FOR MANAGING DOCUMENT PEDIGREES

STATEMENT REGARDING FEDERALLY-SPONSORED RESEARCH

This invention was made with government support under Contract No. 2456-0001DMACS awarded by the U.S. Department of Homeland Security. The government has certain rights in the invention.

BACKGROUND OF THE INVENTION

Tracking the lineage or history of a data item such as a document can be accomplished in a number of ways using commercially available products. For example, Microsoft Word allows user to enter comments so that changes can be tracked as the document is edited. Products that keep track of document versions allow users to open and edit documents in a way that allows an administrator to keep track of each version after each edit. Content management systems also allow for the assignment of identifiers to recently created or modified work that resides in the system's repository.

These document tracking techniques offer the general ability to follow the life of a data item but each technique suffers from significant drawbacks, such as the absence of an ability to robustly track multiple formats of data items using a common scheme or a requirement for significant overhead and complex software to accomplish their task. For example, the comment and change tracking ability of Microsoft Word is specific to this software application, and does not apply to other data formats such as text documents, images, video, or even other Microsoft document formats. In addition, the information contained within the document is not preserved if the document is lost. Version trackers and content management systems typically require substantial overhead and significant storage space, because items to be tracked must be stored in a central repository where their use (checking in/out) is under strict control, and multiple versions of the items to be tracked must be stored.

SUMMARY OF THE INVENTION

Accordingly, embodiments of the present invention provide systems and methods for managing the pedigree of an electronic document. The systems comprise a client and a pedigree manager. The client is operable by a user to access an electronic document, send a first pedigree request when the electronic document is accessed, and save the electronic document with a first pedigree identifier (first PID), and the pedigree manager is configured to receive the first pedigree request from the client, generate the first PID and a first pedigree entry for the electronic document, where the first pedigree entry comprises the first PID, send the first PID to the client, and save the first pedigree entry to a storage area. The methods comprise accessing an electronic document, generating a first pedigree request comprising first context information about the electronic document, in response to generating the first pedigree request, generating a first PID and a first pedigree entry for the electronic document, where the first pedigree entry comprises the first PID and the first context information, saving the electronic document with the first PID, and saving the first pedigree entry to a storage area.

Also provided are systems and methods in which accessing the electronic document can comprise editing or modifying the electronic document, or printing or transmitting the electronic document. The first pedigree request can be a request to create or update a pedigree for the electronic document, and can comprise context information about the electronic document. The context information can comprise one or more of a user name of the user, a timestamp indicating the time at which the electronic document was accessed, a source address for the user, and an action type indicating how the electronic document was accessed. The first pedigree entry can comprise the context information. The system can be a computer program product stored on a tangible storage medium.

Further provided are systems where the client can be further operable to access the saved electronic document, send a second pedigree request when the saved electronic document is accessed, and re-save the saved electronic document with a second pedigree identifier (second PID), and the pedigree manager can be further configured to receive the second pedigree request from the client, generate the second pedigree identifier (second PID) and a second pedigree entry for the saved electronic document, where the second pedigree entry comprises the second pedigree identifier (second PID), send the second pedigree identifier (second PID) to the client, and save the second pedigree entry to the storage area. The second pedigree request can comprise the first PID, and the pedigree manager can be further configured to search the storage area for the first PID prior to generating the second PID. The client can be further configured to send a pedigree display request to the pedigree manager, where the pedigree manager is further configured to, upon receipt of the pedigree display request, display the first and second pedigree entries to the user.

Additionally provided are methods that further comprise accessing the saved electronic document, generating a second pedigree request comprising second context information about the electronic document when the saved electronic document is accessed, in response to generating the second pedigree request, generating a second pedigree identifier (second PID) and a second pedigree entry for the electronic document, where the second pedigree entry comprises the second PID and the second context information, re-saving the electronic document with the second PID, and saving the second pedigree entry to the storage area. The second pedigree request can be a request to update a pedigree for the electronic document. The methods can further comprise generating a pedigree display request, and in response to generating the pedigree display request, searching the storage area for the first and second pedigree entries and generating a display of the first and second pedigree entries.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION OF THE PREFERRED EMBODIMENTS

The present invention is directed to methods and systems for managing and tracking the pedigree or data lineage of an electronic document. The methods and systems provide a standardized way for managing the pedigree of an electronic document regardless of its data type (e.g., email, image, video, etc.), which provides at least three distinct advantages. First, a common implementation regardless of data type benefits users, who do not have to learn multiple pedigree techniques, and administrators, who can be assured that electronic documents are being properly tracked. Second, data forensics are simpler, because investigators only need to access the stored pedigree, instead of each version of an electronic document, to determine how an electronic document has been used over time. Third, the pedigree can be as robust as desired, by including virtually unlimited details and identifiers in the pedigree.

The electronic documents can be any type of electronic file or data now known or later developed, such as, but not limited to HTML and XML Web content, document images, electronic records, database records, word processing documents, presentation slides, office documents, e-mail messages or archives, textual data, electronic books, graphics, audio, video, SMS or MMS messages, other digital representations of information, and/or combinations thereof.

Figure 1:
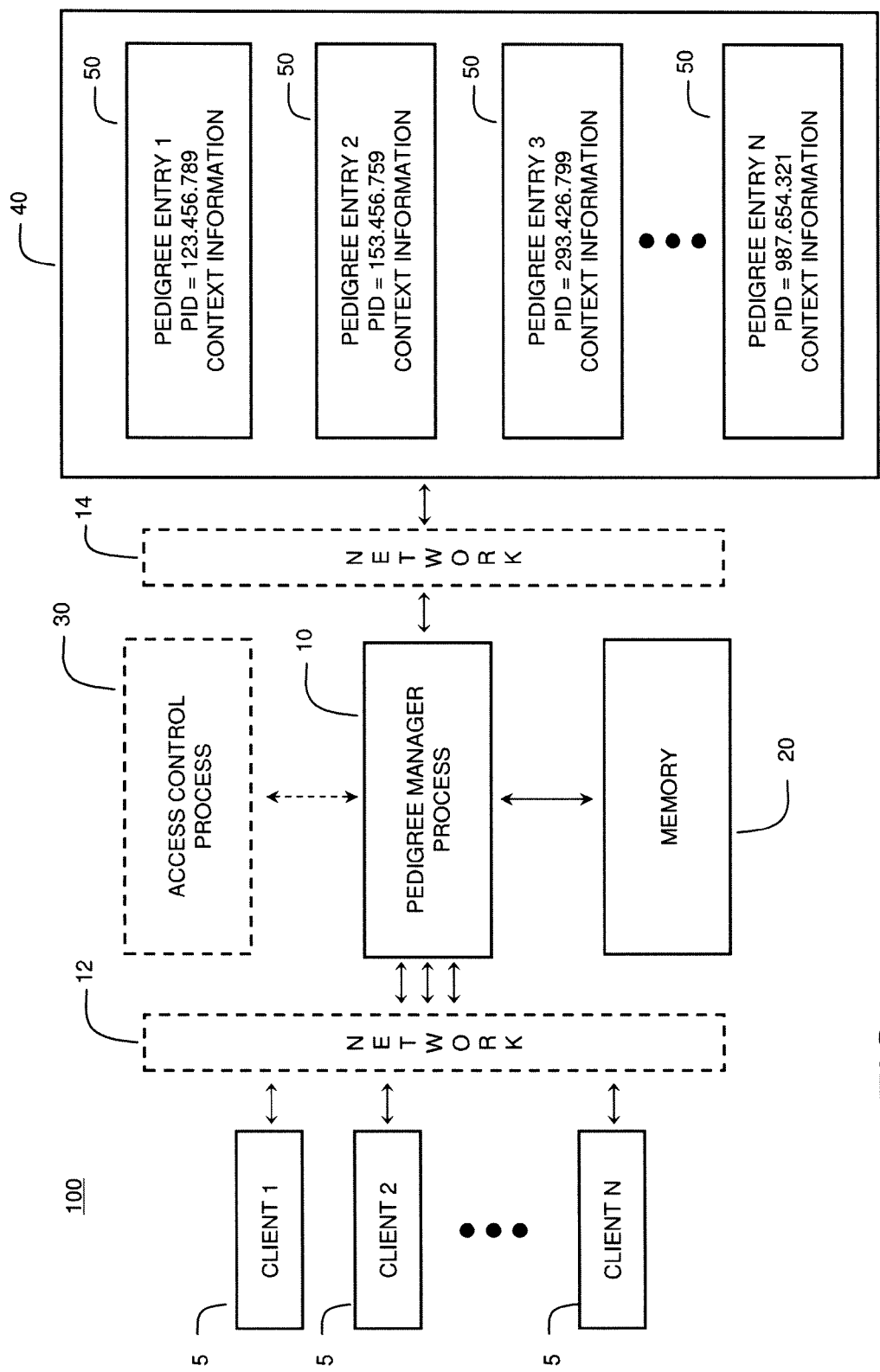
FIG. 1 depicts a block diagram of a pedigree management system of an embodiment of the present invention.

Referring now to the Figures, an exemplary system employing pedigree management according to an embodiment of the present invention is illustrated in FIG. 1. The system shown in FIG. 1 is particularly suited to the management of electronic document pedigrees over a network or the Internet. The pedigree management system 100 includes a pedigree manager process 10, associated shared or working memory 20, and one or more data storage areas 40 for storing pedigree entries 50, which are connected over networks 12, 14 to each other and to clients 5. Optionally, the system may include an access control process 30, which controls access to certain documents, records, or other information based on the pedigree entry and the access privileges granted to a user. The system 100 may include additional servers, clients, and other devices not shown, and individual components of the system may occur either singly or in multiples, for example, there may be more than one data storage area in the system.

The pedigree manager process 10 may provide an application program configured for creating, modifying, archiving, deleting or removing pedigree information managed by the system 100, and may contain tools used for pedigree management, access control, content indexing, and facilities for performing searches and other operations related to the pedigree entries managed by the system 100. Optional access control process 30 may provide an application program configured to enable users at various authorization levels to access and manage documents whose pedigrees are stored in the system 100 in a flexible manner, for example by consulting the pedigree entry of a requested document, or an access control list, before granting a user access to the document. When a user accesses an electronic document, the associated pedigree entry is loaded from data storage areas 40 into memory 20, so that the pedigree information may be updated as needed by pedigree manager process 10. The data storage areas 40 may be local to the pedigree manager process 10, or remote from and in communication with the pedigree manager process 10 via a network 14.

Generally, clients 5 provide an interface to the functions provided by the pedigree management system 100, for example, mechanisms for creating, viewing, searching and exporting pedigree entries from the system, etc. The clients 5 can be configured to provide "visible" or "invisible" interfaces to the system. For example, in a first embodiment, the clients 5 provide end-users with an invisible interface to the pedigree management system, in that the end-users are able to access and manipulate electronic documents whose pedigrees are being managed by the system, without the end-users even being aware of the pedigree management system. In such an embodiment, the clients 5 would also provide a system administrator with a visible interface to the system, so that a system administrator is able to, e.g., create, view, search and export pedigree entries from the system. In a second embodiment, the clients 5 provide end-users and administrators with a visible interface to the system, although administrators may be provided with additional options (e.g., deleting or exporting pedigree entries) that are not available to end-users. The clients 5 may be local to the pedigree manager process 10 and data storage areas 40, or remote from and in communication with the pedigree manager process 10 and data storage areas 40 via networks 12, 14. An Application Program Interface (API) may be used to provide access to the pedigree manager processor 10. The clients 5 may communicate with the pedigree manager processor 10 directly, or may submit the queries to a database server.

Figure 2:
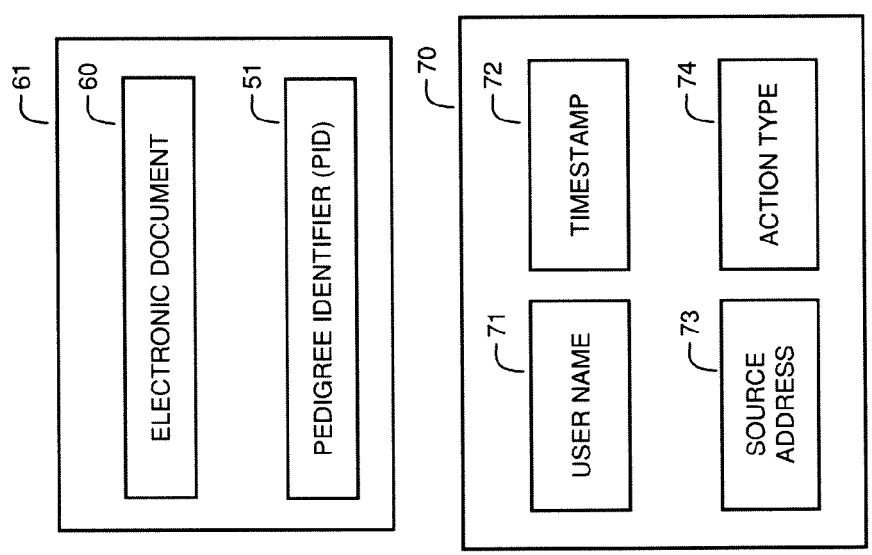
FIG. 2 is a diagram illustrating an electronic document and associated context information according to an embodiment of the present invention.

An exemplary electronic document 60 is shown in FIG. 2, along with its associated context information 70. The electronic document 60 is associated with an envelope 61, which has the primary purpose of holding the pedigree identifier (PID) 51 associated with the electronic document, and giving the client software an expected format. The envelope 61 may be in any suitable format, for example the XML format shown below:

```
<envelope>
    <pid>123.456.789</pid>
    <dataitem>
        "Data in here."
    </dataitem>
</envelope>
```

The context information 70 associated with a particular electronic document 60 includes any information about the document that is desired to be stored in the pedigree entry, for example the user name 71 of the user who last accessed on the document, a timestamp 72 indicating the time at which the document was accessed, the source address 73 (e.g., IP address, MAC address, etc.) of the user, the action type 74 (e.g., print, save, modified, deleted, etc.) that was performed on the document, etc.

With reference to FIGS. 1 and 2, in operation, a user is able to interface with the pedigree management system through client 5, which communicates with the pedigree manager process 10, in order to make a request, for example to create, display, update, or delete a pedigree entry stored in the pedigree management system that is associated with a particular electronic document. A request may be made at any time or based on any event desired to be tracked by the pedigree, such as when an electronic document is edited, modified, printed or transmitted (e.g., attached to an email). For example, the system may be designed to save or update, either automatically or manually, a pedigree entry to the pedigree management system when a document is accessed.

Figure 3:
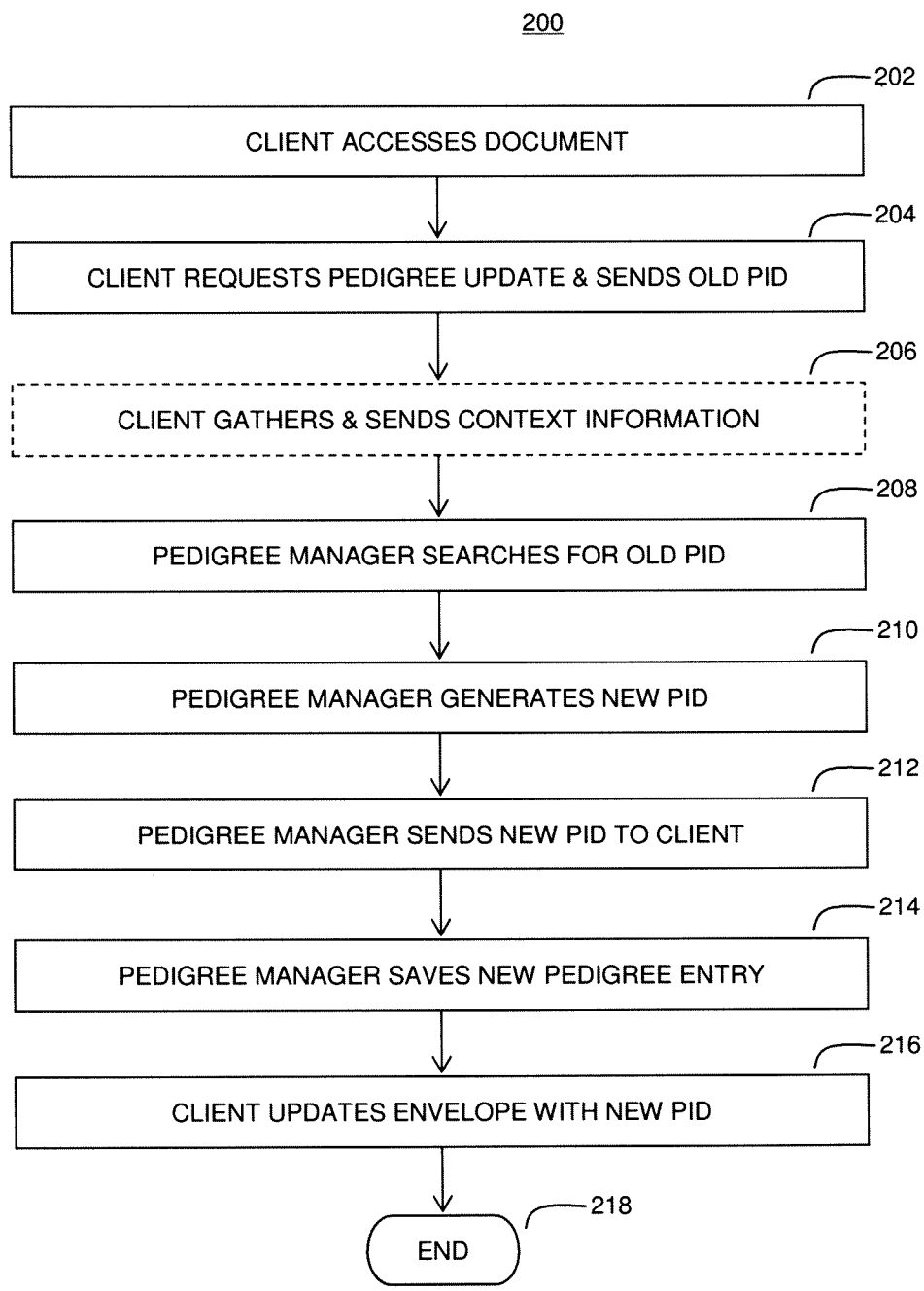
FIG. 3 is a flow chart illustrating an pedigree update process according to an embodiment of the present invention.

An exemplary process for updating a pedigree is shown in FIG. 3, and is described with reference to FIGS. 1 and 2. The pedigree update process 200 is initiated at step 202, when the client 5 accesses a particular electronic document 60 and parses the envelope 61 associated with the document. The client 5 uses the parsed information to send a request for a pedigree update to the pedigree manager process 10 in step 204. This request includes the PID 51 that is currently associated with the electronic document (the "old PID"). Optionally at step 206, the client 5 may also gather and send context information 70 about the electronic document to the pedigree manager process 10. At step 208, the pedigree manager process 10 receives the request, parses the old PID, and locates the most recent pedigree information for the electronic document 60 by searching for the old PID information. The pedigree manager process then generates a new PID for the electronic document in step 210, and sends the new PID to the client 5 in step 212. A new pedigree entry 50 (e.g., a database record) associated with the electronic document 60, including the new PID and any context information, is created and saved to the data storage area 40 in step 214, and in step 216 the client updates the envelope 61 with the new PID. At step 218 the pedigree update process is terminated.

Figure 4:
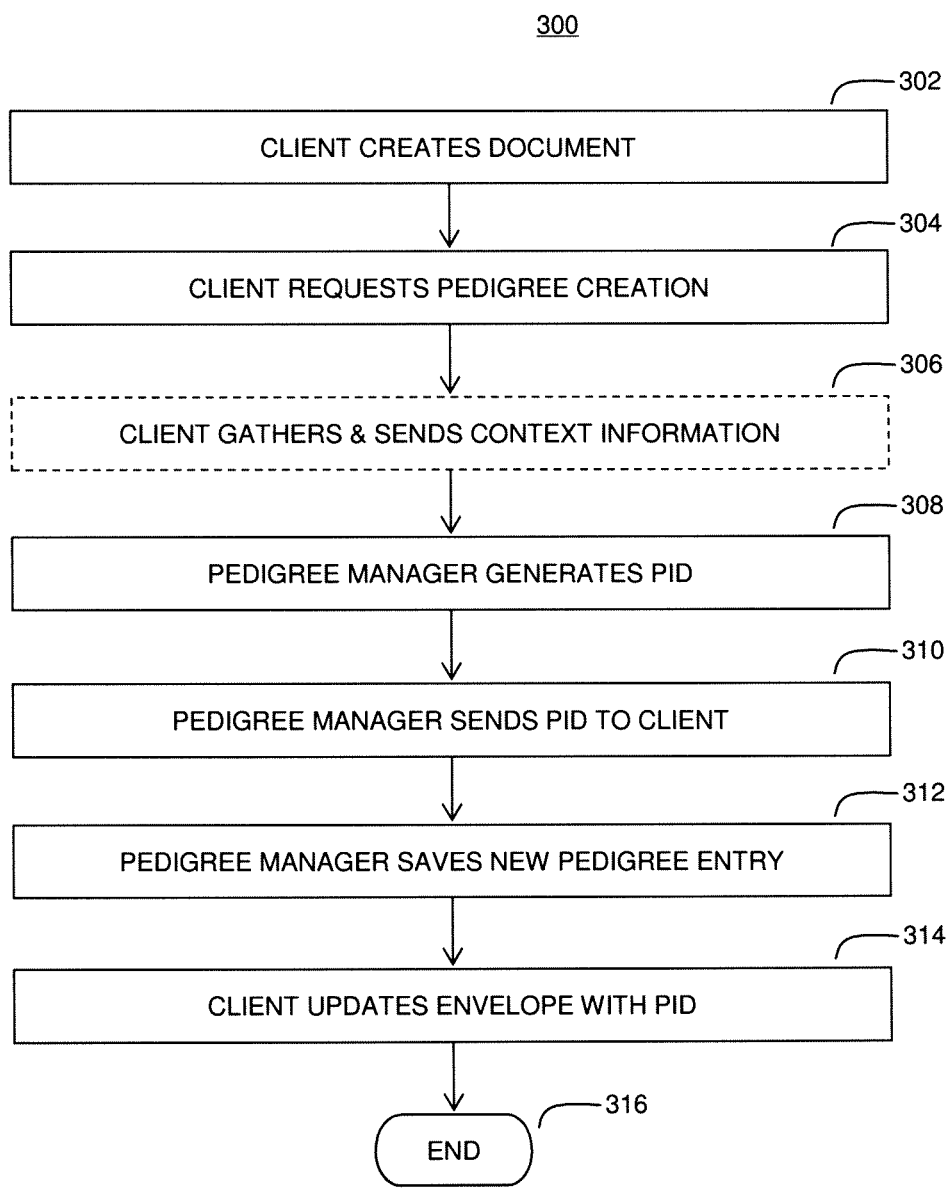
FIG. 4 is a flow chart illustrating a pedigree creation process according to an embodiment of the present invention.

An exemplary process for creating a new pedigree for a new electronic document is depicted in FIG. 4, and can be seen to share similarities with the update process of FIG. 3. The pedigree creation process 300 is initiated at step 302, when the client 5 creates a new electronic document 60 and creates an envelope 61 associated with the document. The client 5 sends a request for the creation of a pedigree to the pedigree manager process 10 in step 304. This request may optionally include context information 70 gathered by the client 5, as shown in step 306. At step 308, the pedigree manager process 10 receives the request, generates a PID for the electronic document in step 308, and sends the PID to the client 5 in step 310. A new pedigree entry 50 (e.g., a database record) associated with the electronic document 60, including the PID and any context information, is created and saved to the data storage area 40 in step 312, and in step 314 the client updates the envelope 61 with the PID. At step 218 the pedigree creation process is terminated.

Figure 5:
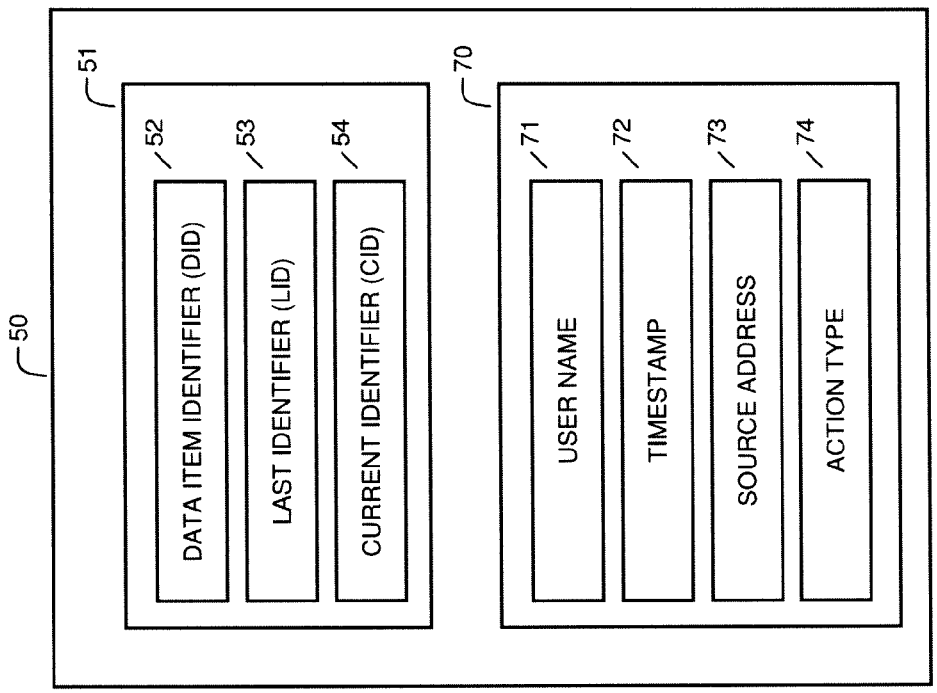
FIG. 5 is a diagram illustrating a pedigree entry according to an embodiment of the present invention.

Each pedigree entry 50 contains a PID 51 and context information 70, as shown in FIG. 5. The context information 70 includes any information about the document that is desired to be stored in the pedigree entry, as described above, for example the user name 71, timestamp 72, source address 73, and action type 74. The context information 70 is the "who", "what", "when" and "where" of the pedigree entry 50. As shown in FIG. 5, the PID 51 has multiple components including the data item identifier (DID) 52, the last identifier (LID) 53, and the current identifier (CID) 54. It is the unique combination of each of these components that provides the ability to track and manage the pedigree of a particular electronic document 60. The DID remains the same for the electronic document throughout its lifetime, and serves to link all of the pedigree entries associated with a particular electronic document together. The CID and LID, however, are different for each pedigree entry, and are selected so that they indicate the appropriate linkage between the pedigree entries, e.g. that a first pedigree entry is the "parent" of a second pedigree entry, and that the second pedigree entry is the "parent" of third and fourth pedigree entries.

With reference to FIGS. 3 through 5, a PID 51 can be parsed into its components, in order to search for a pedigree entry, create a new PID, or collect and display pedigree information. For example, when a new pedigree is created, a new and unique DID is generated for the electronic document, for example the identifier "123", a PID counter is created for the electronic document and set to a starter value, for example "1", and the CID and LID are each set to the value of the PID counter. Thus, the initial PID can be represented as DID.LID.CID, for example 123.1.1. As the electronic document is modified, a new PID is created by updating the old PID associated with the document. For example, if the existing PID is 123.456.789, the LID of 456 is discarded, and the CID of 789 is moved into the LID position. A new CID is created by incrementing the PID counter for the electronic document, and then setting the new CID to the value of the incremented PID counter. For example, if the PID counter is incremented to a value of 851, the new CID is set to the PID counter value of 851, and the new PID is thus 123.789.851.

Figure 6:
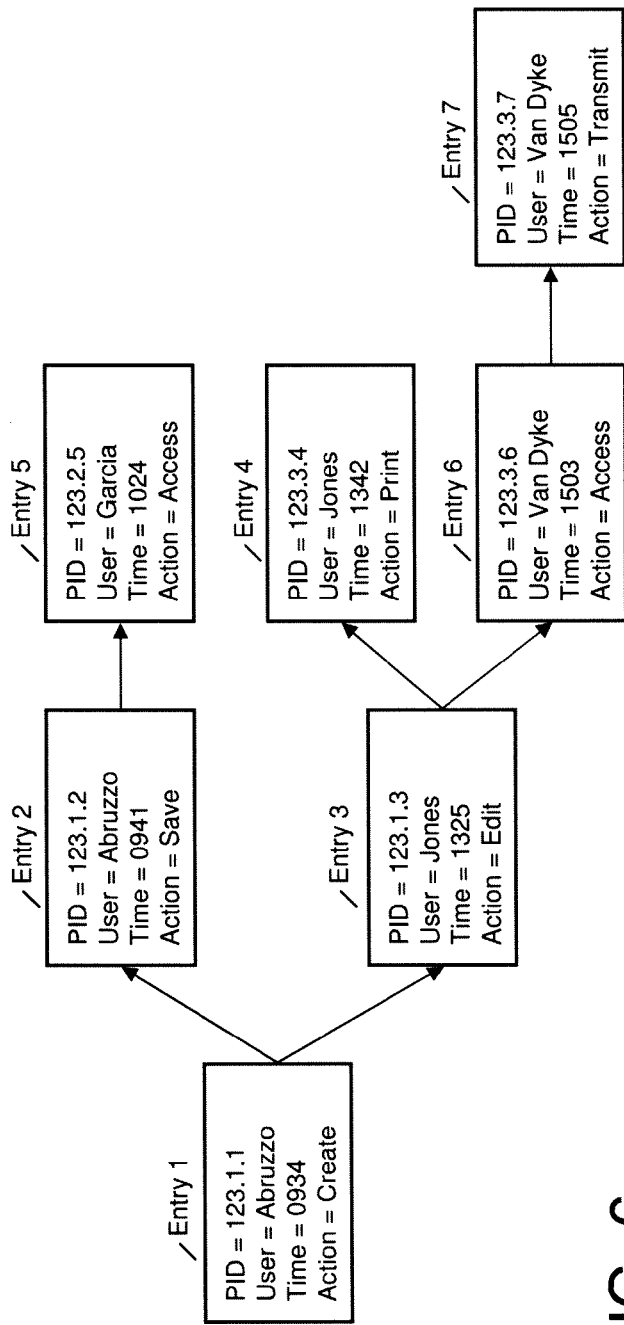
FIG. 6 depicts a pedigree of an electronic document in graphical and tabular form according to an embodiment of the present invention.

The relationship between the CID and LID values of each PID allows the pedigree management system to track the pedigree of each electronic document. An administrator or other authorized user can use the client to send a pedigree display request to the pedigree manager process, which upon receipt of a display request searches for all of the pedigree entries associated with a particular electronic document, and then displays the pedigree, for example in graphical or tabular form as shown in FIG. 6. The pedigree can be printed, exported, etc. in a similar fashion. In the graphical depiction, each box represents a pedigree entry associated with an electronic document, and each entry can be seen to contain information such as the PID, the user name, the time, and the type of action performed on the document. For example, pedigree entry 5 shows that user Garcia accessed the document at 10:24 am, and pedigree entry 4 shows that user Jones printed the document at 1:42 pm. The relationship between the LID and CID of the pedigree entries allows the system to construct the pedigree, for example because entry 6 indicates that the LID (last identifier) as 3, the system knows that entry 3 is the "parent" of entry 6.

The pedigree management system described herein is useful as a usage tool for data accountability and tracking, as a security tool, and as a forensics tool. In terms of usage, access to and modifications of a document can be monitored, and in terms of security, an administrator can utilize the pedigree information to restrict access to particular documents, for example based on who has created the document, who has modified the document, when the document was created, etc. Also, in the event of a data breach, it may be necessary to determine the lineage of a particular document. The detailed pedigree provided by the present system provides an investigator with significant insight into how the document has been used over time, e.g. how widespread has the document been disseminated within the enterprise, when, where, and to who.

The embodiments of the present invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be available on a recordable medium (e.g., magnetic, optical, floppy, DVD, CD, etc.) or in the form of a carrier wave or signal for downloading from a source via a communication medium (e.g., network, LAN, WAN, Intranet, Internet, etc.). The software may be part of an operating system or a specific application, component, program, module, object, or sequence of instructions.

It is to be understood that the software may be implemented in any desired computer language and could be developed by one of ordinary skill in the computer arts based on the functional descriptions contained in the specification and flow charts illustrated in the drawings. By way of example only, the software may be implemented in the C#, C++, Python, Java, XML or PHP programming languages, and data storage may be implemented in MySQL, Oracle, SQL Server, IBM DB2, Informix or a flat database, etc. Further, any references herein to software performing various functions generally refer to computer systems or processors performing those functions under software control.

The computer systems may alternatively be implemented by any type of hardware and/or other processing circuitry. The various functions of the computer systems may be distributed in any manner among any quantity of software modules or units, processing or computer systems, objects, data structures and/or circuitry, where the computer or processing systems may be disposed locally or remotely to each other and communicate via any suitable communications medium (e.g., LAN, WAN, Intranet, Internet, hardwire, modem connection, wireless, etc.). The software and/or algorithms described above and illustrated in the flow charts may be modified in any manner that accomplishes the functions described herein. In addition, the functions in the flow charts or description may be performed in any order that accomplishes a desired operation.

Furthermore, the present embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In a preferred embodiment, the computer-usable or computer-readable medium is a tangible medium.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. Memory may be implemented by any conventional or other memory or storage device (e.g., RAM, cache, flash, etc.), and may include any suitable storage capacity. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the processing system to become coupled to other processing systems or remote printers or storage devices through intervening private or public networks. Modems, cable modem and Ethernet cards are just a few of the currently available types of network adapters.

End-user systems may be implemented by any quantity of conventional or other computer systems or devices (e.g., computer terminals, personal computers (e.g., IBM-compatible, Apple MacIntosh, tablet, laptop, netbook, etc.), cellular telephone, personal data assistant (e.g., Palm Pre, Treo, iPhone, etc.), etc.) and may include any commercially available operating system (e.g., AIX, Linux, OSX, Sun Solaris, Unix, Windows XP, etc.) and any commercially available or custom software (e.g., browser software, communications software, word processing software, etc.). These systems may include displays and input devices (e.g., keyboard, mouse, voice recognition, etc.) to enter and/or view information. The end-user systems may be local to the process and data storage areas, or remote from and in communication with the server and data storage areas via a network.

Networks may be implemented by any quantity of any suitable communications media (e.g., WAN, LAN, Internet, Intranet, wired, wireless, etc.). The computer systems may include any conventional or other communications devices to communicate over the networks via any conventional or other protocols, and may utilize any type of connection (e.g., wired, wireless, etc.) for access to the network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for managing the pedigrees of electronic documents, comprising:

a non-transitory memory having a plurality of electronic documents stored therein, wherein each electronic document in the plurality of electronic documents is associated with an envelope stored in the memory, and wherein each envelope comprises a pedigree identifier (PID), and wherein each PID comprises a document identifier (DID), a last access identifier (LID) and a current access identifier (CID);

a non-transitory storage area having a plurality of pedigree entries stored therein, wherein one or more pedigree entries are associated with one of the plurality of electronic documents and each pedigree entry comprises context information about an access to the associated electronic document, and wherein each pedigree entry also comprises an associated pedigree identifier (PID) that identifies the associated electronic document with a DID, identifies the access to the associated electronic document with a CID, and identifies an immediately prior access with an LID;

a pedigree manager; and a client device operable by a user to:
  access a first electronic document from the plurality of electronic documents, wherein the associated envelope for the first electronic document comprises a first pedigree identifier (first PID) comprising a first DID, a first CID and a first LID;
  parse the associated envelope for the first electronic document to obtain the first PID;
  send a first pedigree request to the pedigree manager when the first electronic document is accessed, wherein the first pedigree request comprises the first PID and context information including a first action type indicating how the first electronic document was accessed;
  receive, from the pedigree manager, a second pedigree identifier (second PID) for the first electronic document, the second PID comprising the first DID, the first CID as a second LID, and a second CID; and
  save the second PID in the associated envelope for the first electronic document;

wherein the pedigree manager is configured to, on one or more computing devices:
  receive the first pedigree request from the client;
  use the first PID to generate the second PID;
  create a new pedigree entry for the first electronic document, wherein the new pedigree entry comprises the second PID and the context information including the first action type;
  send the second PID to the client; and
  save the new pedigree entry to the storage area.

2. The system of claim 1, wherein the step of accessing the first electronic document comprises editing or modifying the first electronic document.

3. The system of claim 1, wherein the step of accessing the first electronic document comprises printing or transmitting the first electronic document.

4. The system of claim 1, wherein the context information comprises one or more of a user name of the user, a timestamp indicating the time at which the electronic document was accessed, and a source address for the client.

5. The system of claim 1, wherein the client is further configured to send a pedigree display request to the pedigree manager, and the pedigree manager is further configured to, upon receipt of the pedigree display request, display the new pedigree entry to the user.

6. The system of claim 1, wherein
the client is further operable by a user to, on one or more computing devices:
  create a second electronic document;
  send, to the pedigree manager, a second request to create a pedigree for the second electronic document wherein the request comprises initial context information about the second electronic document;
  receive, from the pedigree manager, an initial pedigree identifier (initial PID) for the second electronic document;
  create an envelope associated with the second electronic document, wherein the associated envelope for the second electronic document comprises the initial PID of the second electronic document; and
  save the second electronic document and the envelope associated with the second electronic document in the memory; and wherein the pedigree manager is further configured to, on one or more computing devices:
  receive the second request to create a pedigree from the client;
  in response to receiving the second request, generate an initial PID for the second electronic document;
  create an initial pedigree entry for the second electronic document, wherein the initial pedigree entry comprises the initial PID of the second electronic document and the initial context information about the second electronic document;
  send the initial PID of the second electronic document to the client; and
  save the initial pedigree entry of the second electronic document to the storage area.

7. The system of claim 6, wherein
the client is further operable by a user to, on one or more computing devices:
  access the stored second electronic document;
  parse the associated envelope for the second electronic document to obtain the initial PID of the second electronic document;
  send, to the pedigree manager, a request to update the pedigree for the second electronic document, wherein the request to update the pedigree comprises the initial PID of the second electronic document and subsequent context information about the second electronic document including an action type indicating how the second electronic document was accessed;
  receive, from the pedigree manager, a subsequent pedigree identifier (subsequent PID) for the second electronic document;
  save the subsequent PID in the associated envelope for the second electronic document; and wherein the pedigree manager is further configured to, on one or more computing devices:
  receive the request to update the pedigree from the client;
  use the initial PID of the second electronic document to generate the subsequent PID;
  create a subsequent pedigree entry for the second electronic document, wherein the subsequent pedigree entry comprises the subsequent PID and the subsequent context information about the second electronic document;
  send the subsequent PID to the client; and
  save the subsequent pedigree entry to the storage area.

8. A method for managing the pedigree of an electronic document, comprising, on one or more computing devices:
  accessing an electronic document stored in a storage area of a memory, wherein the electronic document is associated with an envelope stored in the storage area of the memory, and wherein the associated envelope comprises a first pedigree identifier (first PID) that is associated with a first pedigree entry for the electronic document, and wherein the first PID comprises a first document identifier (first DID), a first last access identifier (first LID), and a first current identifier (first CID);
  generating a first pedigree request when the electronic document is accessed, wherein the first pedigree request comprises the first PID and first context information about the electronic document including a first action type indicating how the electronic document was accessed;

in response to the generated first pedigree request, generating a second pedigree identifier (second PID) using the first PID, the second PID comprising the first DID, the first CID as a second LID, and a second CID;

in response to the generated second PID, generating a second pedigree entry for the electronic document, wherein the second pedigree entry comprises the second PID and the first context information;

in the envelope associated with the electronic document, overwriting the first PID with the second PID; and saving the second pedigree entry to the storage area.

9. The method of claim 8, wherein the step of accessing the electronic document comprises editing or modifying the electronic document.

10. The method of claim 8, wherein the step of accessing the electronic document comprises printing or transmitting the electronic document.

11. The method of claim 8, wherein the first pedigree request is a request to create a pedigree for the electronic document.

12. The method of claim 8, wherein the first context information comprises one or more of a user name of a user accessing the electronic document, a timestamp indicating the time at which the electronic document was accessed, and a source address indicating where the electronic document was accessed.

13. The method of claim 8, further comprising:

re-accessing the electronic document;

generating a second pedigree request when the electronic document is accessed, wherein the second pedigree request comprises the second PID and second context information about the electronic document including a second action type indicating how the electronic document was re-accessed;

in response to generating the second pedigree request, using the second PID to generate a third pedigree identifier (third PID) and a third pedigree entry for the electronic document, wherein the third pedigree entry comprises the third PID and the second context information;

saving the third PID in the associated envelope; and saving the third pedigree entry to the storage area.

14. The method of claim 13, wherein the third PID comprises the first DID, the second CID as a third LID, and a third CID.

15. The method of claim 8, further comprising generating a pedigree display request, and in response to generating the pedigree display request, searching the storage area for the first and second pedigree entries and generating a display of the first and second pedigree entries.

* * * * *